United States Patent [19]
Kauss et al.

[11] Patent Number: 4,667,744
[45] Date of Patent: May 26, 1987

[54] VEHICLE WITH HINGED ATTACHMENT IMPLEMENT

[75] Inventors: Wolfgang Kauss, Wombach; Norbert Mucheyer, Rechtenbach; Kurt Wittich, Lohr/Main, all of Fed. Rep. of Germany

[73] Assignee: Mannesmann Rexroth GmbH, Fed. Rep. of Germany

[21] Appl. No.: 680,163

[22] Filed: Dec. 10, 1984

[30] Foreign Application Priority Data

Dec. 23, 1983 [DE] Fed. Rep. of Germany ....... 3346892

[51] Int. Cl.$^4$ ............................................. A01B 63/11
[52] U.S. Cl. ....................................... 172/2; 280/405 B
[58] Field of Search ............... 172/2, 7; 280/707, 772, 280/DIG. 1, 405 B, 446 A; 37/DIG. 1, 126 R; 56/10.2; 318/587; 364/463; 404/84; 414/699

[56] References Cited

U.S. PATENT DOCUMENTS

| | | | |
|---|---|---|---|
| 3,225,852 | 12/1965 | Simmons et al. | 37/126 R X |
| 4,093,248 | 6/1978 | Gassner et al. | 172/2 X |
| 4,402,527 | 9/1983 | Kakehi et al. | 280/707 |
| 4,449,733 | 5/1984 | Iida et al. | 280/707 |
| 4,465,142 | 8/1984 | Van der Lely et al. | 172/7 |
| 4,470,121 | 9/1984 | Ebert | 364/463 X |
| 4,537,275 | 8/1985 | Kimura et al. | 280/707 X |

FOREIGN PATENT DOCUMENTS

| | | | |
|---|---|---|---|
| 57-17021 | 1/1982 | Japan | 172/2 |
| 57-182505 | 11/1982 | Japan | 280/772 |
| 383794 | 7/1973 | U.S.S.R. | 37/DIG. 1 |
| 626169 | 8/1978 | U.S.S.R. | 37/DIG. 1 |
| 653347 | 3/1979 | U.S.S.R. | 37/DIG. 1 |

*Primary Examiner*—Richard T. Stouffer
*Attorney, Agent, or Firm*—Steinberg & Raskin

[57] ABSTRACT

A vehicle, such as a tractor, has an attachment implement, such as a plow. An automatic controller acts upon a power lift of the plow, which moves the plow during operation in trenching position. In a first control, this motion of the plow ensues relative to the tractor, so that the vertical absolute velocity component of the plow becomes approximately zero. The plow is so moved relative to the vehicle that it moves upward during a downward motion of the plow-tractor joint and downward during an upward motion of such joint. The tractor is this completely disconnected dynamically from the plow, so that the pitching vibration behavior of the tractor is not subjected to a negative change due to the moments resulting from the forces of acceleration of the plow and affecting the plow, as is the case with a vehicle having a rigidly connected attachment implement. In a second control, the plow is moved in opposite phase to the tractor to counteract a change of its pitching angle coordinate. This results in a pitching angle behavior having an amplitude which is less than that of a tractor without an attachment implement.

10 Claims, 5 Drawing Figures

VEHICLE WITH HINGED ATTACHMENT IMPLEMENT

BACKGROUND OF THE INVENTION

The present invention relates to a vehicle with a hinged attachment implement. More particularly, the invention relates to a tractor operating with a plow, for example.

A vehicle such as, for example, a tractor is operated with an attachment implement such as, for example, a plow. When operating the vehicle with the attachment implement in lifted, that is, not in operating position, the vibration behavior of the implement, due to its rigid connection to the vehicle, changes in comparison to a vehicle without an attachment implement. More particularly, when operated at high speeds and/or across uneven terrain the vehicle is, due to the mass moment of inertia caused by the attachment implement, subjected to considerable pitching vibrations. This results in the static front axle load, which in any case has already been reduced by the weight of the attachment implement, being eliminated partially, or even completely. The road contact of the front wheels, which is thereby lost from time to time, prevents effective steering of the vehicle during this phase of operation, thus creating a considerable danger of accident which, in some cases, might even cause the vehicle to turn over. These pitching vibrations occur, above all, in the 0.5 to 5 Hz frequency range, and they depend essentially on the springiness of the tires, as well as on the mass and position of the center of gravity of the entire team, that is, the vehicle and the attachment implement.

Due to the forces affecting a tractor and a plow pulled by it, because of uneven terrain, acceleration of speed or brake acceleration, or similar forces, and the moments resulting therefrom, an actual pitching angle, relative to the plane of vertical deflections of the tractor, occurs during operation. The resulting deflection, relative to the static position of the tractor, results in a self-aligning torque due to the cushioning and damping characteristics of the tires or the entire wheel arrangement, which, together with the moment of inertia of the rigidly connected plow, acts upon the tractor and produces the temporary time-dependent pitching angle of the tractor. In this connection, the moment of inertia of the tractor itself must also be taken into consideration.

In order to reduce the pitching vibrations, it has been proposed to replace the rigid coupling of the attachment implement by a cushioning and damping element. The springiness and attenuation constant of the damping element are so developed that, in reference to the portion of the pitching vibration of the dynamic wheel loads, it functions as a vibration absorber. This type of coupling is fully effective only at a specific frequency. Furthermore, the dynamic wheel loads are reduced by the passive absorption of the pitching vibrations. However, the attachment implement still exercises a considerably negative influence on the pitching vibrations of the vehicle.

SUMMARY OF THE INVENTION

The principal object of the invention is to provide a vehicle with attachment implement in which the attachment implement does not exercise an adverse influence on the pitching vibrations of the vehicle.

The principal object of the invention is attained, in accordance with the invention, by changing a relative angle coordinate $(\beta-\psi)$ of the vehicle in the opposite direction to the direction change of a pitching angle coordinate $(\beta)$ of the vehicle.

By regulating the motion of the attachment implement relative to the vehicle, which, with respect to the attachment implement, results in a vertical absolute velocity component of almost zero, the two subsystems, that is, the vehicle and the attachment implement, may be vibration-mechanically disconnected. This prevents the attachment implement from creating forces of inertia affecting the vehicle. The pitching vibrations of the vehicle, with regard to those which occur on vehicles with a rigidly connected attachment implement, are actively absorbed by this motion of the attachment implement. Such motion of the attachment implement is triggered by mechanical elements.

Due to the controlled motion of the attachment implement in a phase opposite that of the motion of the vehicle, the forces thus exerted on the vehicle so influence the vehicle that its pitching vibrations are even lower than those of vehicles without an attachment implement.

In accordance with the invention, a power lift for lowering and lifting the attachment implements is used to create the required motions of the attachment implement, which are actuated by a control signal of an automatic controller.

BRIEF DESCRIPTION OF THE DRAWINGS

For a fuller understanding of the invention, reference is had to the following description, taken in connection with the accompanying drawings, in which.

DESCRIPTION OF PREFERRED EMBODIMENTS

Figure 1:
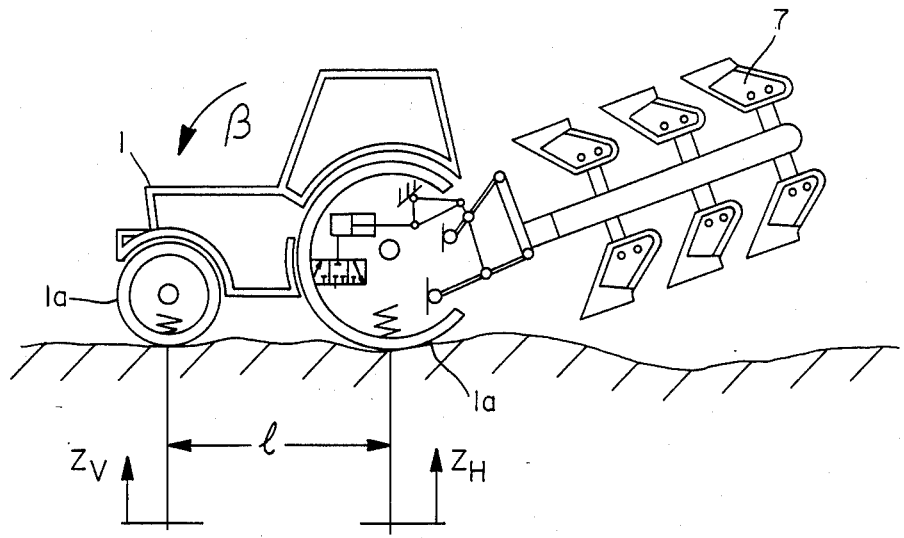
FIG. 1 is a schematic diagram of a tractor with a plow in trenching position, the plow being rigidly connected.
Figure 2:
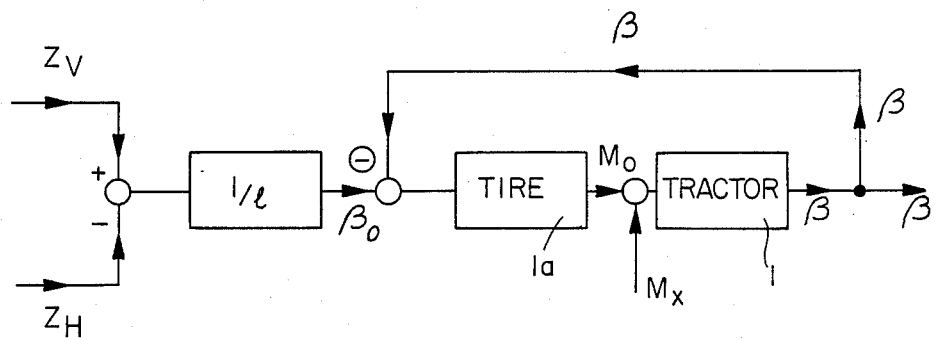
FIG. 2 is a block diagram illustrating the pitching vibration behavior of the team of FIG. 1.

FIGS. 1 and 2 show a tractor 1 with a plow 7 rigidly connected to said tractor during transportation and a block diagram for the pitching vibration behavior of the team 1, 7 of FIG. 1, respectively. In FIGS. 1 and 2, $Z_V$ and $Z_H$ indicate the vertical deflections of the tractor at the front and rear axle when said tractor is stopped. These deflections result from the trenching position of the attachment implement or plow 7 and effect a turn of the tractor 1 at an angle $\beta_0$, given as $$\beta_0 = (Z_V - Z_H)/l$$

wherein $l$ is the wheel base.

An actual pitching angle $\beta_1$ in the same plane as $\beta_0$ is produced during operation of the team by the forces affecting said team due to uneven terrain, acceleration of speed or brake acceleration, or similar forces, and the moments resulting therefrom. The resulting deflection $\beta_0 - \beta$, with reference to the static position $\beta_0$ of the tractor 1, results in a self-aligning torque $M_0$, due to the cushioning and damping characteristics of the tires 1a or the entire wheel arrangement. The self-aligning torque $M_0$, together with the moment of inertia $M_X$ of the rigidly connected plow 7, acts upon the tractor 1 and produces the temporary time-dependent pitching angle $\beta$ of said tractor. In this connection, the moment of inertia of the tractor 1 itself must be taken into consideration.

Figure 3:
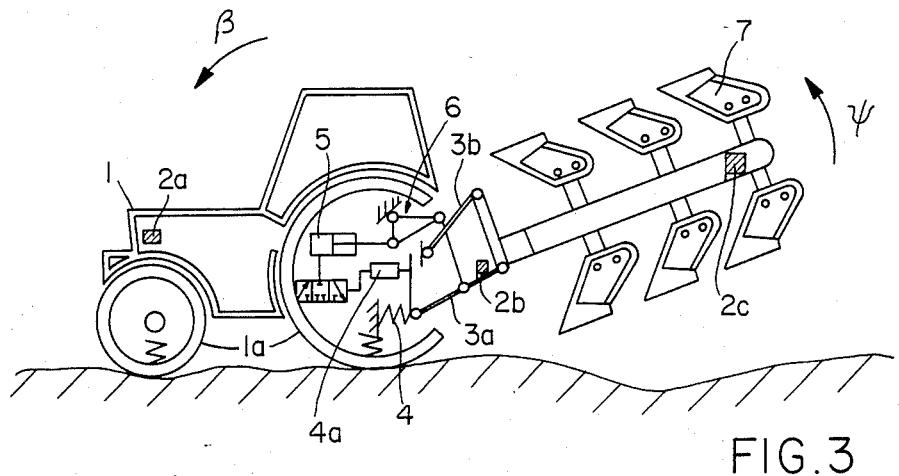
FIG. 3 is a schematic diagram of a tractor with a plow in trenching position, the plow being moved by an automatic controller via a power lift, in accordance with the invention.

FIG. 3 shows a team consisting of the tractor 1, which is a vehicle, and the plow 7, which is the attachment implement. The plow 7 is hingedly coupled to the tractor 1 by a lower steering link or rod 3a and an upper steering link or rod 3b. The plow 7 may be moved by a lift linkage 6, which is activated by a hydraulic lift cylinder 5 and, together with said lift linkage, forms a power lift, not only between the operating positions and a trenching position, but also with a limited amplitude relative to a central trenching position. The apparatus also includes a traction regulator 4. The amplitude of the motion of the plow 7 relative to the trenching position is effected by an automatic controller 4a acting upon the lift cylinder 5. The controller 4a functions in a manner whereby the pitching vibrations of the tractor 1 are actively absorbed, as hereinafter described in detail. The plow 7 is moved relative to the tractor 1 depending upon the method of vibration absorption. The control itself is effected by supplying a suitable signal to a position control system of the lift cylinder 5 and heterodyning said signal, the heterodyning ensuing only during the trenching operation.

The signal required for controlling the vibration absorption may be generated by two different methods. Pitching and vertical vibrations of the team 1, 7 subject said team to forces of acceleration, or accelerations, which can be measured directly by sensors 2, such as, for example, acceleration pickups, placed at determined locations. Thus, for example, an acceleration pickup 2a may be attached to the tractor 1, itself, an acceleration pickup 2b may be affixed to the lower steering rod 3a of the plow 7, and an acceleration pickup 2c may be affixed to said plow, itself.

On the other hand, forces of acceleration can be measured at suitable locations on the team 1, 7 and evaluated as a dimension for the accelerations. Therefore, instead of the traction force, which is measured by a traction gauge during operation of the plow 7 in its lower position, the force of acceleration resulting from the inertia of said plow may be gauged. Wire strain gauges, spiral springs with displacement transducers, or non-contacting sensors, which absorb the stress imposed upon ferromagnetic material on account of the magnetoelastic principle, may be used as gauges in this case. The force produced in the lift linkage 6 by acceleration can be determined by a similar method. It is also practical to gauge the pressure of the lift cylinder 5, as well as the force resulting therefrom, by electrically loaded cells.

The advantage of the second method of signal generation is that the acceleration forces occurring with a heavy attachment implement 7 are stronger than those with a light attachment implement, and can thus be measured with greater accuracy. This also applies to attachment implements 7 which have a large distance from the center of gravity to the rear axle of the tractor 1. It is also advantageous to provide a stronger control with heavy, as well as long, attachment implements 7, which have a strong effect on the vibration behavior of the tractor 1, than with light-weight and short attachment implements. This also applies if the first type of signal generator is attached to the plow 7.

Figure 4:
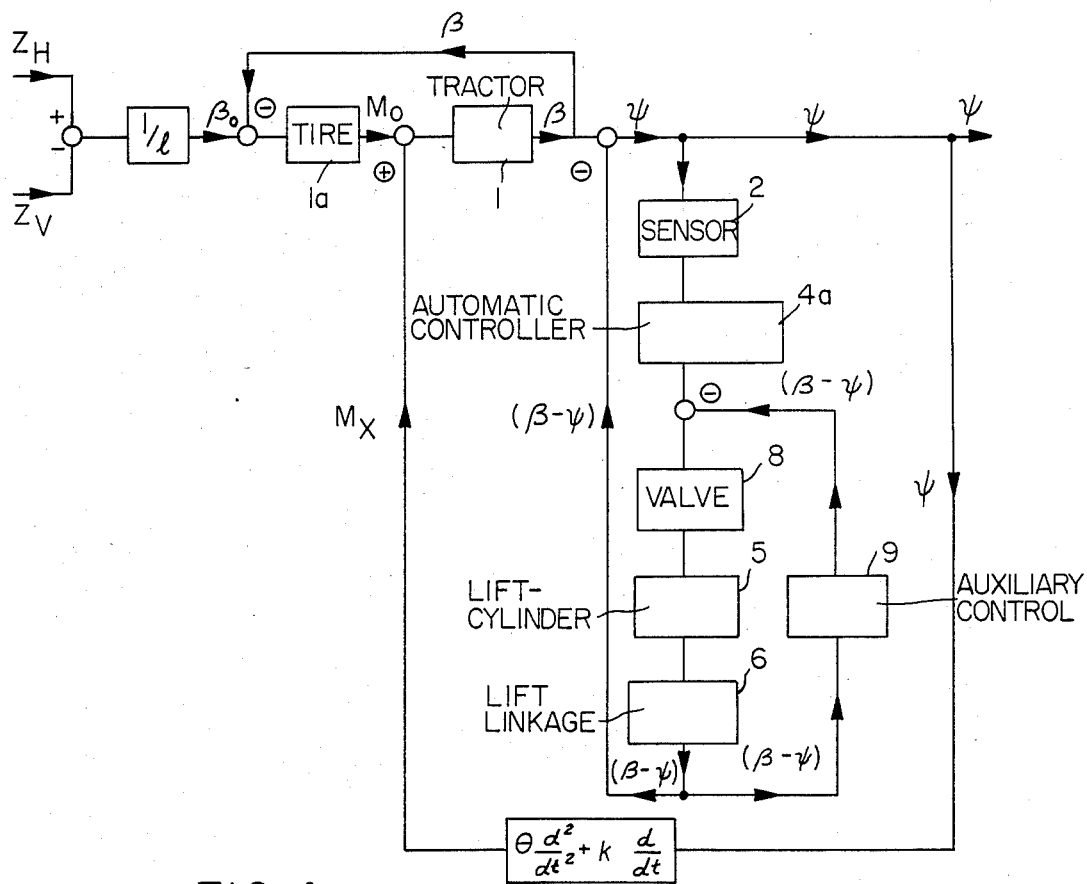
FIG. 4 is a block diagram showing a first embodiment of the apparatus of the invention, and illustrating a first control principle.

FIG. 4 is a block diagram of apparatus for actuating a dynamic disconnection of the tractor 1 and the plow 7. The object of FIG. 4 is to stabilize the vertical motion of the plow 7 as much as possible, so that the tractor 1 is not dynamically influenced by the pitching vibrations of said plow. The development of the pitching angle coordinate of the tractor 1, in accordance with the block diagram of FIG. 2, requires the return of the moment of inertia $M_X$ from a temporary angular coordinate $\psi$, with reference to a plane parallel to the reference plane $\beta$, as illustrated in the block diagram of FIG. 4. The moment of inertia $M_X$ thus results from the equation $$M_X = \theta \frac{d^2}{dt^2} \psi + k \frac{d}{dt} \psi. \tag{1}$$

wherein $\theta$ is the moment of inertia of the plow 7, k is an attenuation constant in the coupling between said plow and the tractor 1, and d/dt is the corresponding time derivation.

Equation 1 shows that $M_X$ is not 0 only if the angular coordinate $\psi$ of the plow 7 is subjected to a change with respect to time. If the angular coordinate $\psi$ is used as a controlled variable, the block diagram of FIG. 2 is to be extended in addition to the described moment of inertia $M_X$, as follows:

The absolute angular coordinate $\psi$ is developed from the pitching angle $\beta$ of the tractor 1 by comparing the relative angle $\beta - \psi$ between said tractor and the plow 7, which, on the one hand, serves to develop the moment of inertia $M_X$. On the other hand, the angle $\psi$ is gauged by the sensor 2 (2a, 2b or 2c), which generates a suitable signal for the automatic controller 4a. The output signal of the automatic controller 4a is fed to an actuator consisting of a valve 8, the lift cylinder 5, and the lift linkage 6. The actuator produces a new relative angle $\beta - \psi$ which is returned and, in comparison to the pitching angle $\beta$, again produces the angular coordinate $\psi$ of the plow 7. The apparatus control circuit is thus closed. In order for the actuator to increase the accuracy of the relative motion of the plow 7, the obtained relative angle $\beta - \psi$ is fed back via an auxiliary control 9, and its signal is compared with that of the automatic controller 4a. The resultant comparison signal is transmitted to the actuator. The measurable or controlled variables can also be the angular velocity $\dot\psi$ or the angular acceleration of the plow 7, the dynamic forces resulting from the pitching motion, or the relative angular coordinate $\beta - \psi$ between the tractor 1 and said plow.

Figure 5:
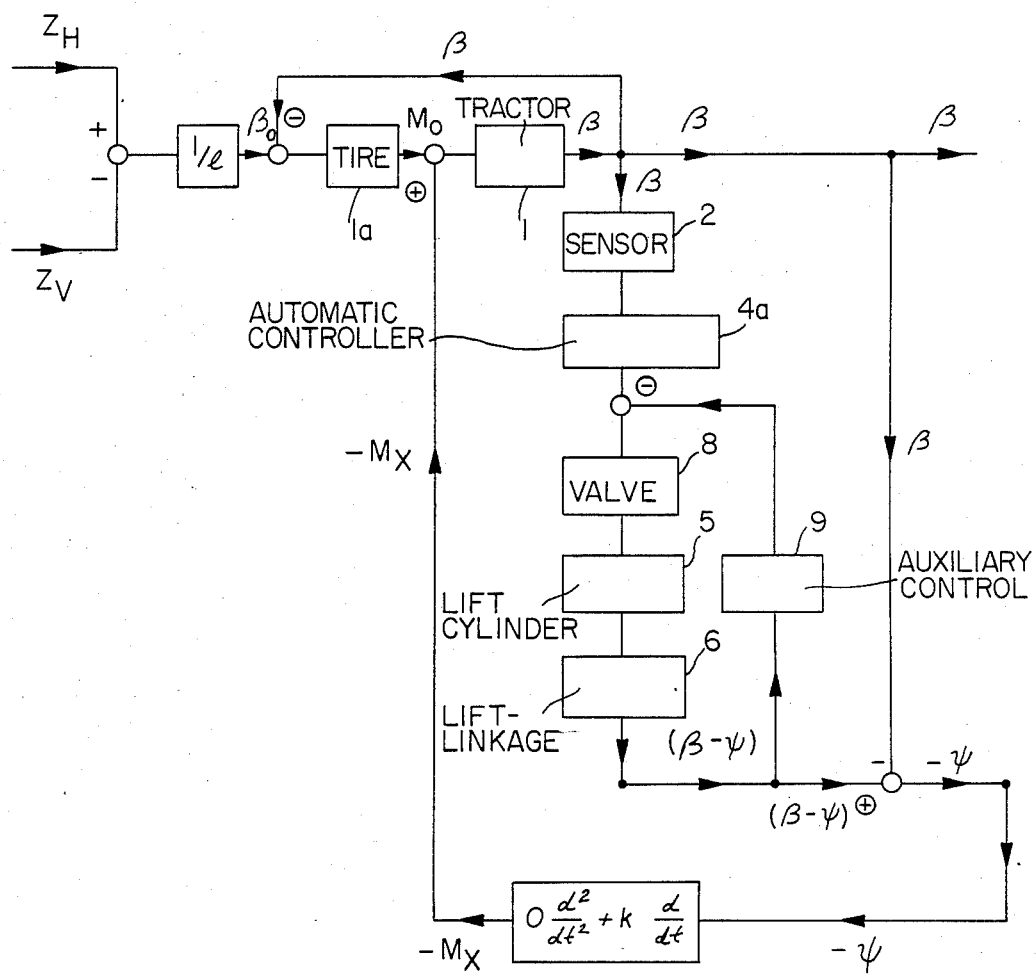
FIG. 5 is a block diagram showing a second embodiment of the apparatus of the invention, and illustrating a second control principle.

FIG. 5 is a block diagram of apparatus in which the angle or angular coordinate $\beta$ of the tractor 1 is gauged as a controlled variable with the objective of keeping the sphere of change of said angle as small as possible, or to counteract its changes. This is achieved by moving the plow 7 in opposite phase to the tractor 1, that is, in a direction opposite to the direction of motion of said plow. This results in a reduction of the pitching vibrations, which reduces the extent of the pitching motion of the tractor to less than that of a tractor without an attachment implement.

As shown in FIG. 5, the resulting pitching angle $\beta$ of the tractor in accordance with the block diagram of FIG. 2, is gauged by a sensor 2 (2a, 2b or 2c) and transmitted by a suitable method to the automatic controller 4a. The output signal of the controller 4a is supplied to the actuator, which constitutes the same apparatus as the actuator of FIG. 4, so that a relative motion between the tractor 1 and the plow 7 is produced. The angular coordinate $\beta - \psi$ of this relative motion is heterodyned with the pitching angle $\beta$ of the tractor 1, in order to generate the angular coordinate $\psi$ of the plow 7. The coordinate $\psi$, in accordance with Equation (1), is again the result of the moment of inertia $M_X$ of the plow 7 exerted on the tractor 1.

As in the apparatus of FIG. 4, in order to increase the accuracy, the relative angle $\beta - \psi$ is fed back via the auxiliary control 9 whose signal is compared with that of the automatic controller 4a. The manipulated variable is thus correspondingly changed due to deviations. The angular velocity $\dot\beta$ or angular acceleration $\ddot\beta$ of the tractor 1, as well as the relative motion $\beta - \psi$ between said tractor and the plow 7 may again be considered as measurable or controlled variables.

The vehicle or tractor 1 having an attachment implement or plow 7 comprises an automatic controller 4a which acts upon a power lift of said plow, which moves said plow during operation in trenching position. In accordance with a first control, this motion of the plow 7 is relative to the tractor 1, so that the vertical absolute velocity component of said plow becomes approximately zero, while said plow is so moved relative to said tractor that said plow moves upward during a downward motion of the plow/tractor joint and downward during an upward motion of said joint. Thus, the tractor 1 is completely disconnected dynamically from the plow 7, so that the pitching vibration behavior of said tractor is not subjected to a negative change due to the moments resulting from the forces of acceleration of said plow and affecting said plow, as is the case with a vehicle with a rigidly connected attachment implement. In accordance with a second control, the plow 7 is moved in opposite phase to the tractor 1 and counteracts a change of its pitching angle coordinate. This results in a pitching angle behavior having an amplitude which is less than that of a tractor without an attachment implement.

The invention is by no means restricted to the aforementioned details which are described only as examples; they may vary within the framework of the invention, as defined in the following claims.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A tractor comprising
    a vehicle portion having front and rear ends, a forward wheeled axle and a rearward wheeled axle, said vehicle portion normally resting on the wheels of said forward and rearward axles, said vehicle portion having a longitudinal axis defining a pitching angle coordinate $\beta$ with respect to a plane of reference;
    a hinged attachment implement having a front end and a rear end, said front end of said implement being hinged to said rear end of said vehicle portion by a connecting mechanism pivotally connected to said vehicle portion at locations which are fixed with respect to said vehicle portion, said attachment implement being liftable to a lifted position in which said attachment implement is supported only at said connecting mechanism with the rear end of the attachment implement freely projecting from the vehicle portion, and defining a relative angle coordinate $\beta - \psi$ therebetween,
    power lift means coupled to said connecting mechanism between said vehicle portion and said implement for controlling the position of said implement with respect to said vehicle portion,
    means for sensing and generating a signal corresponding to a change in the pitching angle coordinate of said vehicle portion; and
    automatic controller means for responding to said signal and for activating said power lift means while said attachment implement is in said lifted position to change said relative angle coordinate $\beta - \psi$ in an opposite direction to a change in the pitching angle coordinate $\beta$ of said vehicle portion 2. The tractor as claimed in claim 1, wherein said automatic controller means produce relative motion between said vehicle portion and said attachment implement in a manner whereby said attachment implement remains essentially steady spatially in a substantially vertical direction.

3. The tractor as claimed in claim 1, wherein said automatic controller means produce a motion of said attachment implement which wanders in the opposite direction to the motion of said vehicle portion to an extent that the sphere of change of the pitching angle coordinate of said vehicle portion is minimized.

4. The tractor as claimed in claim 1, wherein said automatic controller means produces a motion of said attachment implement relative to said vehicle portion corresponding to a motion with limiting amplitude relative to a central trenching position of said attachment implement.

5. The tractor as claimed in claim 1, additionally comprising a position control system for controlling various operating and trenching positions of said attachment implement,
    wherein said automatic controller means act upon said position control system and said signal is fed to said position control system and heterodynes said position control system.

6. The tractor as claimed in claim 1 wherein said signal generating means include a traction regulator of said attachment implement.

7. The tractor as claimed in claim 1, wherein said power lift means include a lift cylinder having pressure therein, and wherein said signal generating means include pressure from said lift cylinder of said power lift means.

8. The tractor as claimed in claim 1, wherein said power lift means include a lift linkage, and wherein said signal generating means include lifting power at a location of said lift linkage of said power lift means.

9. The tractor of claim 1, wherein said power lift means comprise
   a lift linkage, and
   a hydraulic lift cylinder.
10. The tractor of claim 1, additionally comprising a steering control linkage for said attachment implement, said steering control linkage comprising a lower steering link and an upper steering link hingedly coupling said attachment implement to said vehicle portion.

* * * * *